Figure 8:
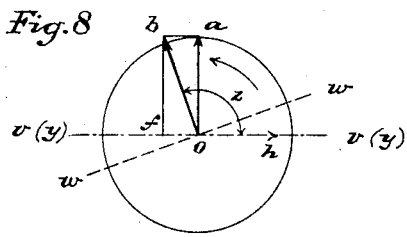

No. 670,557. Patented Mar. 26, 1901.
M. DÉRI.
CONTINUOUS CURRENT MACHINE AND APPARATUS.
(Application filed Mar. 24, 1900.)
(No Model.) 2 Sheets—Sheet 1.
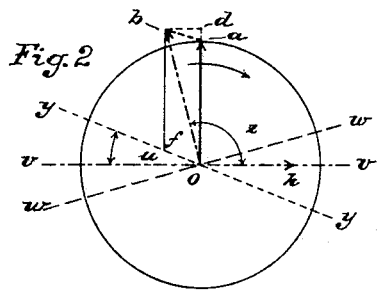
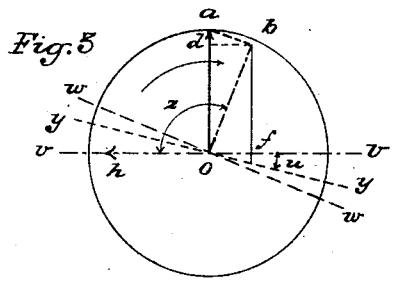
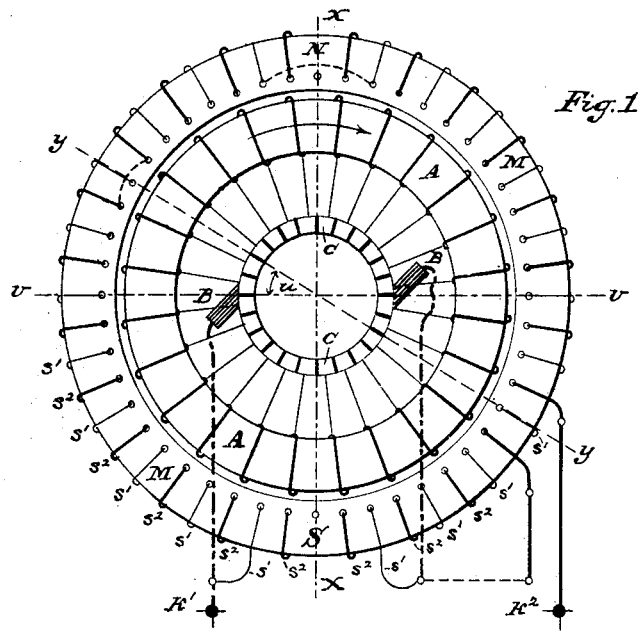
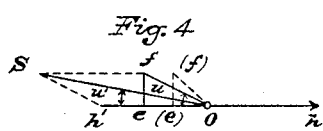
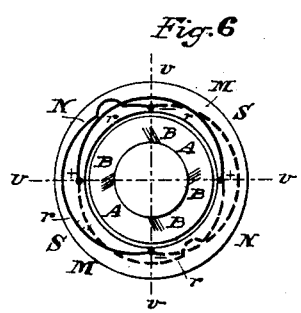
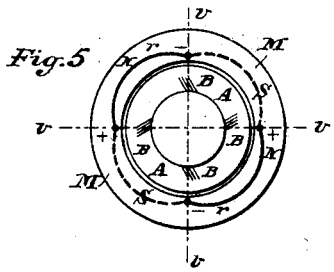
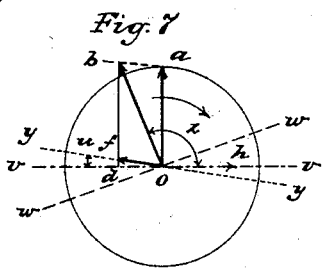
WITNESSES:
Walter Abbs
P. C. Connor
INVENTOR
Max Déri
BY
Howson and Howson
ATTORNEYS No. 670,557. Patented Mar. 26, 1901.
M. DÉRI.
CONTINUOUS CURRENT MACHINE AND APPARATUS.
(Application filed Mar. 24, 1900.)
(No Model.) 2 Sheets—Sheet 2.

WITNESSES:
Walter Abbe
S. C. Connor

INVENTOR
Max Déri
BY
Howson and Howson
ATTORNEYS

UNITED STATES PATENT OFFICE.

MAX DÉRI, OF VIENNA, AUSTRIA-HUNGARY.

CONTINUOUS-CURRENT MACHINE AND APPARATUS.

SPECIFICATION forming part of Letters Patent No. 670,557, dated March 26, 1901.

Application filed March 24, 1900. Serial No. 10,041. (No model.)

*To all whom it may concern:*

Be it known that I, MAX DÉRI, a subject of the Emperor of Austria-Hungary, and a resident of Vienna, Austria-Hungary, have invented certain Improvements in Continuous-Current Machines and Apparatus, of which the following is a specification.

In continuous-current machines whose armature-field is neutralized by means of an opposite field of the same strength, as also in rotatory and stationary converters, no armature reaction exists; but it is nevertheless necessary to shift the brush of the commutator from the neutral zone in order to attain a commutation free from sparking. By the shifting of the brushes out of the neutral zone, however, arises a reaction of the armature and an undesirable variation of the pressure.

The present invention has for its object a method of magnet-winding which renders it possible to attain in machines whose armature-field is neutralized a commutation without sparking with fixed position of the brushes, while at the same time the decrease of pressure is prevented or the armature-pressure is varied in a desired manner.

The shifting of the brushes in the direction of the rotation in a generator and in the contrary direction to the rotation in a motor is equivalent to an increase of the angle between the main magnetic field and the brush-axis. In order to produce this change of angle, the magnetic field according to this invention is shifted, while the brushes remain stationary. The turning of the field is effected automatically and in such relation to the variable armature-current that for every load a sparkless commutation is effected. The field which induces the electromotive force in the armature is also automatically influenced in such manner that any desired regulation of the armature-pressure can be produced.

In order to simultaneously effect the turning of the resultant field and the desired regulation of the armature-pressure, a special compensation winding is provided on the field-magnets, through which the main current passes, exciting a field that combines with the main field to produce a resultant field of such intensity and position that by this means the two desired effects are produced. The required conditions for these arrangements are as follows: First, that there exists no armature-field or only a very weak one; second, that the main field and the compensation-field shall develop and combine as uniformly as possible, preferably in sine form, this being effected by arranging the field-magnet all around and equisdistant from the armature, and, third, that the main field shall be excited with uniform strength, (shunt-wound machines.)

I will describe the new arrangements with reference to the accompanying drawings, in which—

Figures 1, 5, 6, 9, and 10 show diagrammatic views of windings on armature and field-magnets, while Figs. 2, 3, 4, 7, and 8 show diagrams of magnetic fields, according to the relation of their strength and direction. In these drawings a bipolar arrangement has been chosen for the sake of simplicity, only in Figs. 5 and 6 it was found expedient to choose the four-pole arrangement.

In all the figures, $v\,v$ indicate the brush-axis or the axis of the (fictitious) armature-field; $w\,w$, the neutral zone; $x\,x$, (N S,) the axis of the main magnetic field, and $y\,y$ the axis of the compensation-field. The curved arrows show the direction of rotation of the armature or of the brushes. The straight arrows show the direction of the magnetic flux.

In the diagrammatic views, B represents the brush; C, the commutator; A, the armature, and M the field-magnet.

In the diagrams, Z is the angle between $v\,v$ and the resulting field-axis; $o$, the center of the system; $o\,h$, the direction of the armature's magnetic flux; $o\,a$, the original, and $o\,b$ the resulting, magnetic field in strength and direction.

Fig. 1 shows, diagrammatically, the arrangement for a shunt-wound machine. The axis of the main field is determined by the shunt-winding $s'\,s'$ and the axis of the compensating field $y\,y$ by the series winding $s^2\,s^2$. The last-named axis forms with $v\,v$ the angle $u$. $k'$ and $k^2$ are the terminals of the machine. Figs. 2 and 3 are the diagrams for this arrangement, with analogous letters of indication. $o\,f$ is in strength and direction the compensation-field dependent on the armature-current. $o\,a$ is the main field, executed by the shunt-winding. The brushes are assumed to be stationary in the line $v\,v$. $o\,b$ is the resultant of $o\,f$ and $o\,a$. This resultant can be taken as resolved into two components—namely, the component which coincides with the axis of the brushes and which forms the commutation-field and the component at right angles thereto, which determines the electromotive force of the armature and constitutes the inducing-field. The strength of the commutating-field is determined by $b\,d$ and the inducing-field by $o\,d$, $o\,d$ being, according to Fig. 2, greater than $o\,a$ by the amount $a\,d$, and, according to Fig. 3, smaller than $o\,a$ by the amount $a\,d$. $w\,w$ is the neutral axis. By the choice, on the one hand, of the number of windings $n$ of the compensation-winding and, on the other hand, of the angle $u$ it is possible to fulfil both the conditions of working—namely, the production of the field component, which generates the electromotive force necessary for the sparkless commutation, and also the field component, which is added to the original magnetic field or is subtracted therefrom for effecting the desired variation of pressure. As the compensation-winding lies in the main-current circuit there is $$o - c = n\,\mathrm{I},$$

where I represents the armature-current. According to Figs. 2 and 3 the commutating-field is $$\mathrm{M}_c = o - c,\,\cos.\,u = (n\,\cos.\,u)\,\mathrm{I} = c^1\,\mathrm{I}.$$

Furthermore, the inducing-field is $$\mathrm{M}_i = o - a + a - d = \mathrm{M} + o - c\,\sin.\,u = \mathrm{M} + (n\,\sin.\,u)\,\mathrm{I} = \mathrm{M} + c^2\,\mathrm{I},$$

where M represents the original strength of field and $c^1$ and $c^2$ are coefficients of definite values. Consequently the commutation-field is proportional to I, as is required for the sparkless working with fixed brushes. In the same way the additional or subtractive field is also proportional to I—that is, the inducing-field will be variable according to a simple relation to the load, as is necessary for the compounding of the generator or of the motor. If for a certain armature-current the commutation-field and for the same armature-current the desired increase or decrease of the inducing-field are given, say, in ampere-windings, then, referring to Fig. 4, the first is marked off as abscissa $o\,e$ (cosine value of $u$) and the latter as ordinate $e\,f$ (sine value of $u$) $o\,f$ is then the value of the compensation-winding for the same current. By dividing $o\,f$ with the current the necessary number of windings will be obtained. Also by means of $u$ will be given the position of the compensation-winding.

In Figs. 1, 2, and 3 no indication is given of the field-winding or of the field which neutralizes the armature-field. This winding also lies in the main-current circuit like the compensation-winding. They can therefore be combined with each other.

If $o\,h$, Fig. 4, be the armature-field, $o\,h'$ its neutralizing value, $o\,e$ and $e\,f$ the values of the commutation and supplemental fields, then $o\,f$ is the resultant of the last two, and $o\,s$ the resultant of $o\,h'$ and $o\,c$. Consequently $o\,s$ represents the field with the direction determined by $u'$, which when excited by a series winding at one and the same time effects the neutralizing of the armature-field, the sparkless commutation, and the compounding.

The assumed construction of the field-magnet, which has a small air-space all around the armature, also in the brush zone, has a consequence that the self-induction coefficient, and consequently also the electromotive force of the commutation, will be very great. Consequently a strong commutation-field must be produced—that is, the compensation will require a considerable number of windings. To obviate this disadvantage and also to render the compensation economical, the following arrangement is employed: On the field-magnet, opposite to the short-circuited armature-winding, is provided a closed winding consisting of one or more convolutions. Fig. 5 shows these windings $r$ lying in the line $v\,v$. For fields that are excited by continuous current these closed windings have no influence whatever, but they exercise a reaction upon the magnetic flux which is produced by the commutation. They oppose, namely, a resistance to the rapidly-changing magnetic flux proceeding from the short-circuited armature-coil, decrease the impedance, and consequently also the self-induction coefficient. The commutation-field can therefore be weaker than would otherwise be the case. If, namely, $o\,e$, Fig. 4, were to assume a small value, then $u$ would be greater and $o\,f$ smaller—that is, the absence of sparking and the regulation of the pressure would be produced with a smaller number of windings.

Instead of providing for each brush a special closed winding $r$, these windings can be combined with each other, as at Fig. 5—namely, those windings which owing to their position between the poles are not of the same sign N S and S N—in which case it is of advantage that the commutating process under the different brushes shall coincide with another.

If alternating fields exist, the inducing action thereof upon the windings $r$ is prevented by combining with each other the like-named windings N S with N S and S N with S N, Fig. 6, in which case it is advisable to take such a position for the brushes in which coincidence of the commutating process does not occur.

The conditions with rotatory converters are analogous to those of continuous-current machines with shunt excitation. Also in this case it is assumed that the field-magnet is arranged uniformly around the armature. Fig.

7 shows the diagram for this case, the letters of reference being the same as before. Also in this case the compensation-field can be arranged in a suitable inclination to $v\,v$, in order that the inducing-field may increase with the armature-current. In this case, however, the regulation of the pressure is effected indirectly, as, according to the known method, by alteration of the field intensity a phase shift of the alternating current is produced, which phase shift reacting upon the line can vary the pressure therein.

In continuous-current machines with stationary armature and revolving field-magnets and brushes the compensation-winding will also revolve, the exciting-currents being supplied by means of contact-rings. Such a reversed arrangement of the dynamo by these means gains in practical importance, because the sparkless commutation is effected automatically without shifting of the brushes. With stationary converters—that is, those where there is produced in the stationary magnet-armature (combined field-magnet and armature) a rotatory field with which the brushes revolve synchronously—the compensation-field will also be a rotatory field with synchronous rotation.

Fig. 8 shows the corresponding diagram, in which the fields and axes are assumed to rotate in the direction of the arrow. As with these apparatus, on account of the small internal resistance, the decrease of pressure is inappreciable, the compensation is, by way of example, only provided for the commutation, $o\,f$ being shown to coincide with the line $v\,v$.

Figure 9:
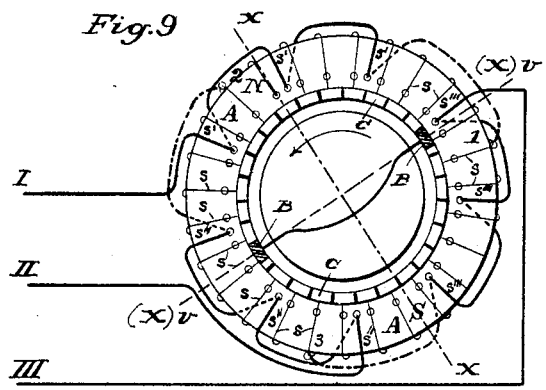

Fig. 9 shows a diagram of winding for the compensation of a three-phase stationary converter. $s\,s$ are the three-phase exciting-winding for the production of the rotation main field $x\,x$ (N S) in the field-armature A. I II III are the three-phase supply-leads, the points of connection of these with the exciting-winding being indicated by 1 2 3. $s'\,s''\,s'''$ are the corresponding three-phase compensation-windings, which, according to their object, carry the three-phase currents and produce a rotatory field $y\,y$, dependent upon the said three-phase currents, and consequently also upon the resulting current, which field lags to the extent of half a polar distance behind the rotation field $x\,x$, produced by the three-phase pressures.

Figure 10:
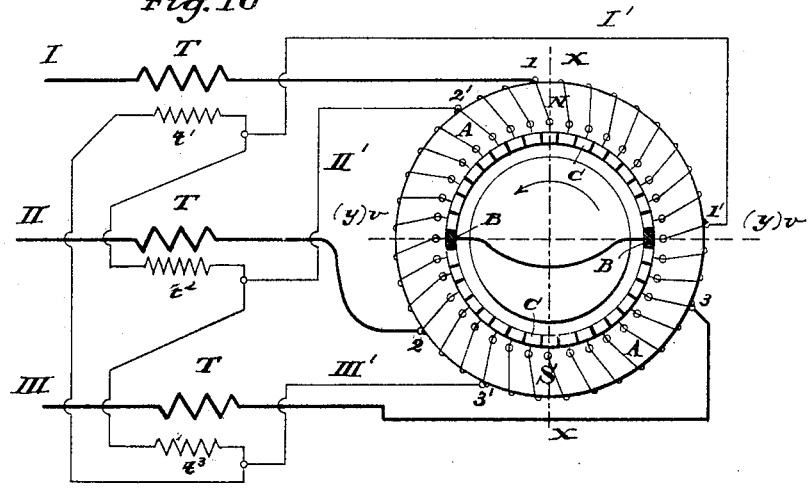

Instead of placing the compensation-windings through which the main current passes upon the field-magnets there may be arranged in the supply-leads a series transformer whose secondary coils produce three-phase pressures, dependent upon the currents passing through I II III. These pressures are applied to a special exciting-winding or to the main exciting-winding $s\,s$, and the points of connection are so chosen that a compensation-field having the required position is produced. Fig. 10 shows a diagrammatic representation of such a case. I, II, and III are the three-phase supply-leads. T is the three-phase transformer, whose secondary pressure-coils $t'\,t^2\,t^3$ are connected in triangular form. The points of connection of the main supply-leads are indicated by 1 2 3, while the secondary supply-leads I′ II″ III‴ are connected at the points 1′ 2′ 3′ to the exciting-winding, so that these produce a rotatory field having the desired lag relatively to the first one, which is dependent upon the strength of the currents supplied through I, II, and III.

I claim—

1. In continuous-current machines and apparatus having armature, commutator and brushes and in which no armature reaction exists, a shunt-excited main field, in combination with a series magnet-winding having an axis at an angle to the brush or armature axis, producing a field which combines with the shunt-excited main field to form a resultant field, variable in strength and position according to the main current, whereby one component effects the sparkless commutation, while the other component effects the regulation of the pressure, substantially as described.

2. In continuous-current machines or apparatus having armature, commutator and brushes and in which the armature reaction is neutralized, the combination of a shunt-excited main-field winding with a magnet-winding through which the main current passes and the axis of which is at an angle to the brush or armature axis, producing a field of variable strength and definite position, the two producing a resultant field whose strength and position vary with the armature-current, whereby the one field component produces the electromotive force necessary for sparkless commutation, while the other field component effects a desired regulation of the machine-pressure dependent upon the armature-current, substantially as described.

3. In continuous-current machines or apparatus having armature, commutator and brushes, the combination of a shunt-excited main-field winding with a magnet-winding through which the main current passes, and the axis of which is at an angle to the brush or armature axis, producing a field of variable strength and definite position, armature-coils and closed windings on the field-magnet, opposite to the armature-coils short-circuited by the brushes, which windings impose a resistance to the alternating magnetic flux produced by the commutation, and consequently reduce the impedance of the commutation-circuit, in order to enable a weaker commutation-field to be employed, substantially as described.

In testimony whereof I have signed my name to this specification in the presence of two subscribing witnesses.

MAX DÉRI.

Witnesses:
 ALVESTO S. HOGUE,
 AUGUST FUGGER.